(12) United States Patent
Rudolph et al.

(10) Patent No.: US 9,802,269 B2
(45) Date of Patent: Oct. 31, 2017

(54) PRESSURE WELDING MACHINE AND PRESSURE WELDING METHOD

(75) Inventors: Frank Rudolph, Kissing (DE); Thomas Hauck, Kissing (DE); Harald Meyer, Augsburg (DE); Klaus Schneider, Friedberg (DE); Manfred Menzinger, Kissing (DE); Otmar Fischer, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 1374 days.

(21) Appl. No.: 12/768,097

(22) Filed: Apr. 27, 2010

(65) Prior Publication Data

US 2010/0206861 A1   Aug. 19, 2010

Related U.S. Application Data

(63) Continuation of application No. 10/599,390, filed as application No. PCT/EP2005/006766 on Jun. 23, 2005, now abandoned.

(30) Foreign Application Priority Data

Jul. 1, 2004   (DE) .................... 20 2004 010 386 U

(51) Int. Cl.
*B23K 33/00*   (2006.01)
*B23K 20/10*   (2006.01)
*B23K 20/12*   (2006.01)

(52) U.S. Cl.
CPC ............ *B23K 20/121* (2013.01); *B23K 20/12* (2013.01)

(58) Field of Classification Search
CPC .............................. B23K 20/12; B23K 20/121
USPC ....... 228/101, 114.5, 115, 3.1, 2.1; 219/123, 219/137 R, 136; 156/104, 580.2, 3.5
See application file for complete search history.

(56) References Cited

U.S. PATENT DOCUMENTS

| | | | |
|---|---|---|---|
| 3,475,580 A * | 10/1969 | Morley | 219/82 |
| 3,516,591 A * | 6/1970 | Gage | 228/2.3 |
| 3,580,459 A * | 5/1971 | Gage et al. | 228/2.3 |
| 3,727,772 A * | 4/1973 | Pauls | 414/746.8 |
| 4,414,046 A * | 11/1983 | Palmer | 156/73.5 |
| 4,733,814 A * | 3/1988 | Penman | 228/2.3 |
| 4,812,090 A * | 3/1989 | Kimura | 409/132 |
| 4,999,476 A * | 3/1991 | Kuchuk-Yatsenko et al. | 219/97 |

* cited by examiner

*Primary Examiner* — Quang D Thanh
*Assistant Examiner* — Ket D Dang
(74) *Attorney, Agent, or Firm* — McGlew and Tuttle, P.C.

(57) ABSTRACT

A pressure welding method is provided and a pressure welding machine (1) is provided with a frame (10), two welding heads (13, 14), mobile along a feed axis (41), and two adjusting units (17, 18). The adjusting units (17, 18) include feed drives (23) for the welding heads (13, 14). The two adjusting units (17, 18) are mounted so as to be axially movable (41) on the frame (10) and are interlinked with an adjusting drive (25) by means of a common adjusting element (26) and supported in a closed system of forces while receiving the pressure welding forces, thereby relieving the frame (10). The common adjusting element (26) is configured as a continuous spindle (27) having two self-locking threads (28, 29) that run in opposite directions.

23 Claims, 3 Drawing Sheets

PRESSURE WELDING MACHINE AND PRESSURE WELDING METHOD

CROSS REFERENCE TO RELATED APPLICATIONS

This application is a continuation of U.S. application Ser. No. 10/599,390 filed Sep. 26, 2006, which is a United States National Phase application of International Application PCT/EP2005/006766 and claims the benefit of priority under 35 U.S.C. §119 of German Patent Application DE 20 2004 101 386.9 filed Jul. 1, 2004, the entire contents of which are incorporated herein by reference.

FIELD OF THE INVENTION

The present invention pertains to a pressure welding machine and a pressure welding method.

BACKGROUND OF THE INVENTION

Such a pressure welding machine is known in the form of a double-head friction welding machine from EP 0 246 239 B1. It comprises a frame with a machine bed, at which two friction welding heads are mounted in such a way that they are movable in opposite directions along a common feed axis. They are moved by two adjusting units with feed drives along the feed axis. The adjusting units are mounted adjustably at the machine frame and are fixed individually in the desired position at the machine bed by hydraulically actuated friction brakes. A central workpiece is connected to additional workpieces on both sides by friction welding with the double-head friction welding machine. The spindle rotations of the two friction welding heads are synchronized by a common countershaft provided with a motor and a brake. Different workpiece lengths result in different path lengths for the friction feed and the upsetting feed, which are generated by different lengths of extension of the feed drives. To absorb the upsetting forces during friction welding, which amount to several tons, the pressure welding machine has a massive frame and machine bed. This means a great design effort, and undesired deformations nevertheless cannot be absorbed. On the other hand, the accessibility of the workplace is limited by the large frame construction.

EP 0 059 544 A1 shows another friction welding machine with spindles that are likewise synchronized by means of a countershaft. The adjusting units are fixed here rigidly and unmovably to the machine bed.

SUMMARY OF THE INVENTION

The object of the present invention is to provide a better pressure welding machine along with a pressure welding method.

According to the invention, a pressure welding machine is provided with a frame, two welding heads, which are movable along a feed axis, and with two adjusting units with feed drives for the welding heads. The two adjusting units are mounted axially movably at the same frame and are connected among one another to an adjusting drive by means of a common adjusting element and are supported.

The pressure welding machine according to the invention has the advantage of requiring a substantially reduced design effort, and a larger working range and better accessibility of the workplace are also achieved at the same time. The forces occurring during upsetting are absorbed in a closed system of forces via the adjusting element, which relieves the load on the frame construction. At the same time, adjustment of the adjusting units in both directions with the feed drives along a preferably common and continuous guide plane can be achieved by means of the adjusting element. Moreover, this adjustment may be symmetrical. Special advantages are offered here by the adjusting element being designed as a continuous spindle with two threads directed in opposite directions, which is connected to the adjusting units via corresponding nut mounts. A self-locking motion thread, which can absorb and support the strong upsetting forces, is favorable here.

A preferably likewise displaceable central clamping device, which is equipped with two workpiece holders, which are connected to the respective adjusting units associated with them via carriage adjusters, are present for the central workpiece. As a result, the central clamping device and the adjusting units can be positioned simultaneously and synchronously. A spring-loaded connection between the carriage adjusters and the workpiece holders makes possible an evading motion of the workpiece holders to absorb the upsetting deformation of the central workpiece during the upsetting stroke.

The pressure welding machine according to the invention may have, moreover, a measuring means, which makes it possible to measure the true feeds and the pure shortenings of the workpiece during pressure welding without the elastic deformations of the central workpiece that occur during upsetting. It is possible as a result to also extrapolate the process parameters determined during a pressure welding process for certain workpieces and workpiece lengths to other workpieces of the same kind but with different lengths. This was hitherto impossible because the elastic deformation of the central workpiece, which likewise changed during a change of the workpiece lengths and thus affected the process parameters, was always contained in the path measured values. It is favorable for the measuring means being claimed to arrange a scale and a corresponding measuring head at the workpiece holder and at the associated welding head in such a way that they are movable in relation to one another, so that what is measured is precisely their motion. The elastic deformation of the central workpiece is eliminated via the elastically non-rigid mobility of the workpiece clamping device.

The pressure welding machine being claimed can operate with any desired pressure welding method. This may be, e.g., friction welding or welding with an arc moved magnetically or in another manner. The workpieces welded together may be rotationally symmetrical, but this is not a compulsory prerequisite.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
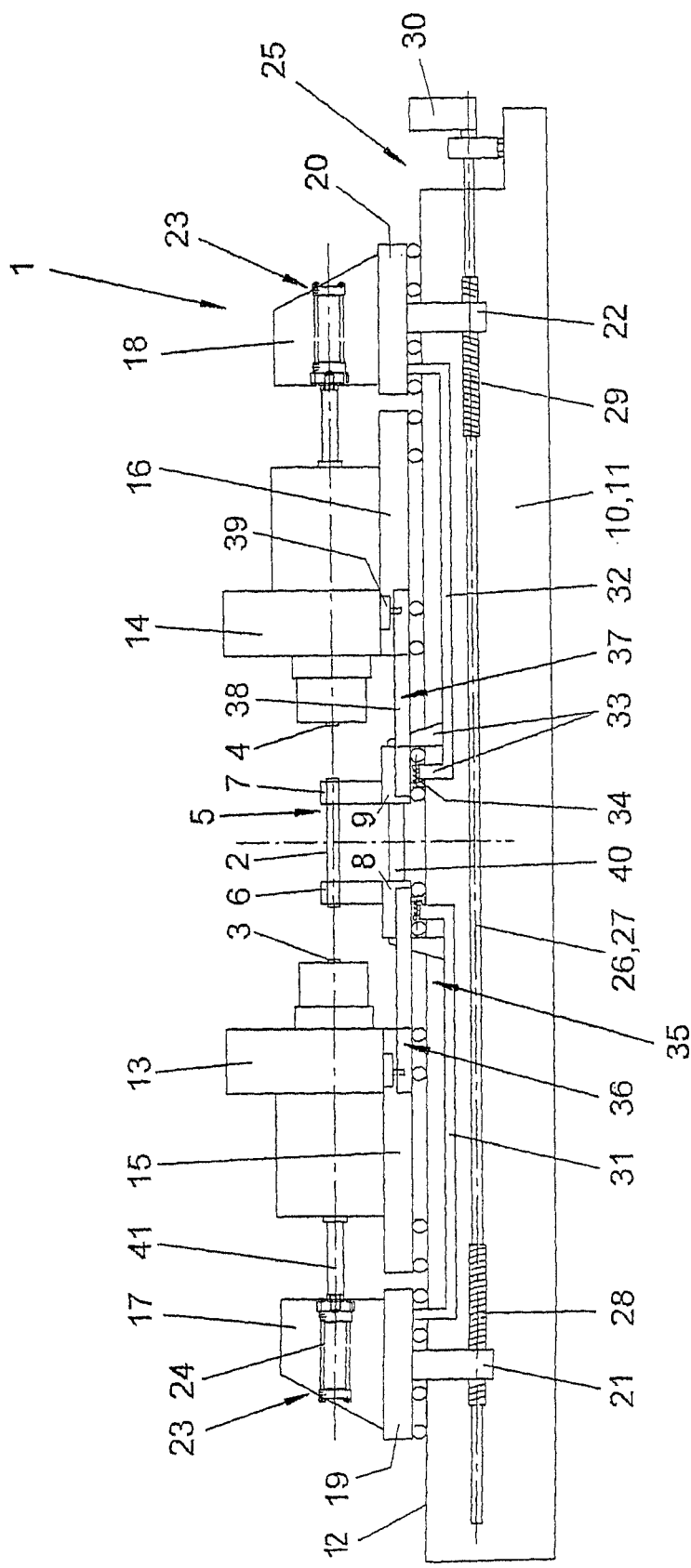
FIG. 1 is a side view of a pressure welding machine in the opened inoperative position.
Figure 2:
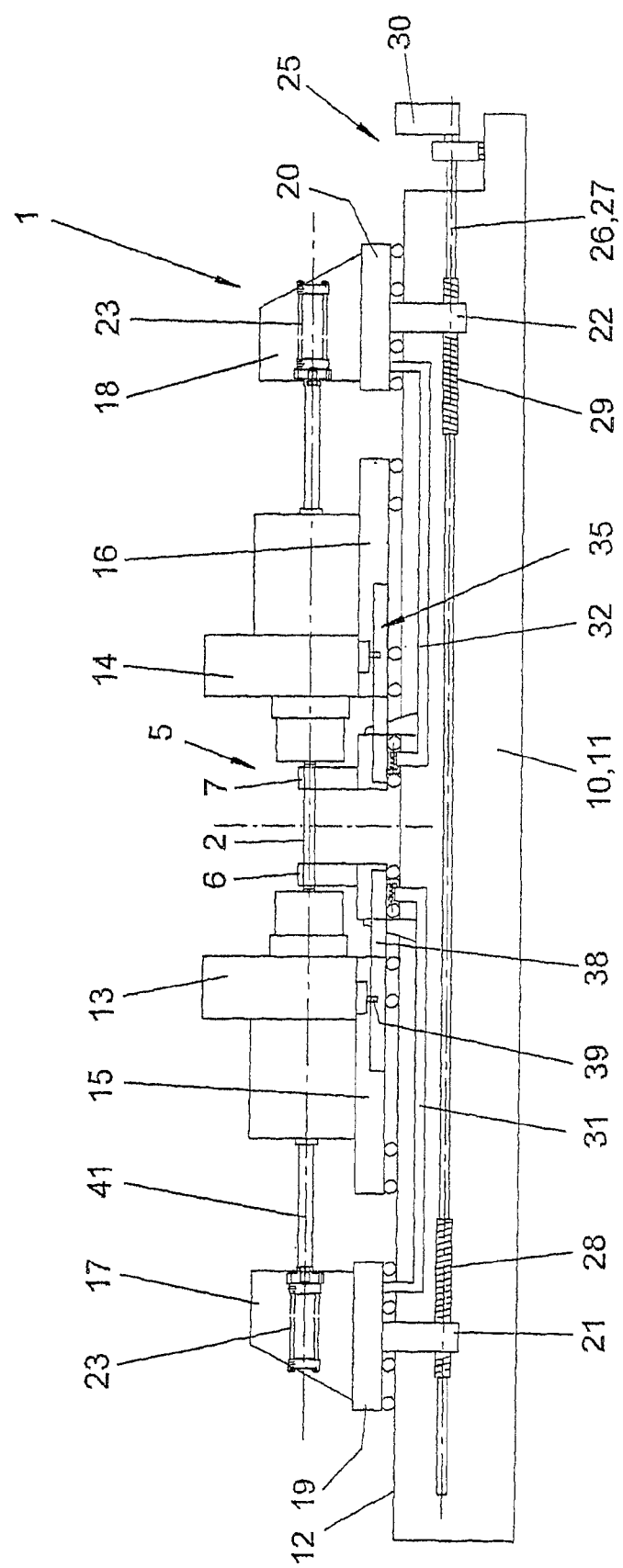
FIG. 2 is a view showing the pressure welding machine according to FIG. 1 in the working position.
Figure 3:
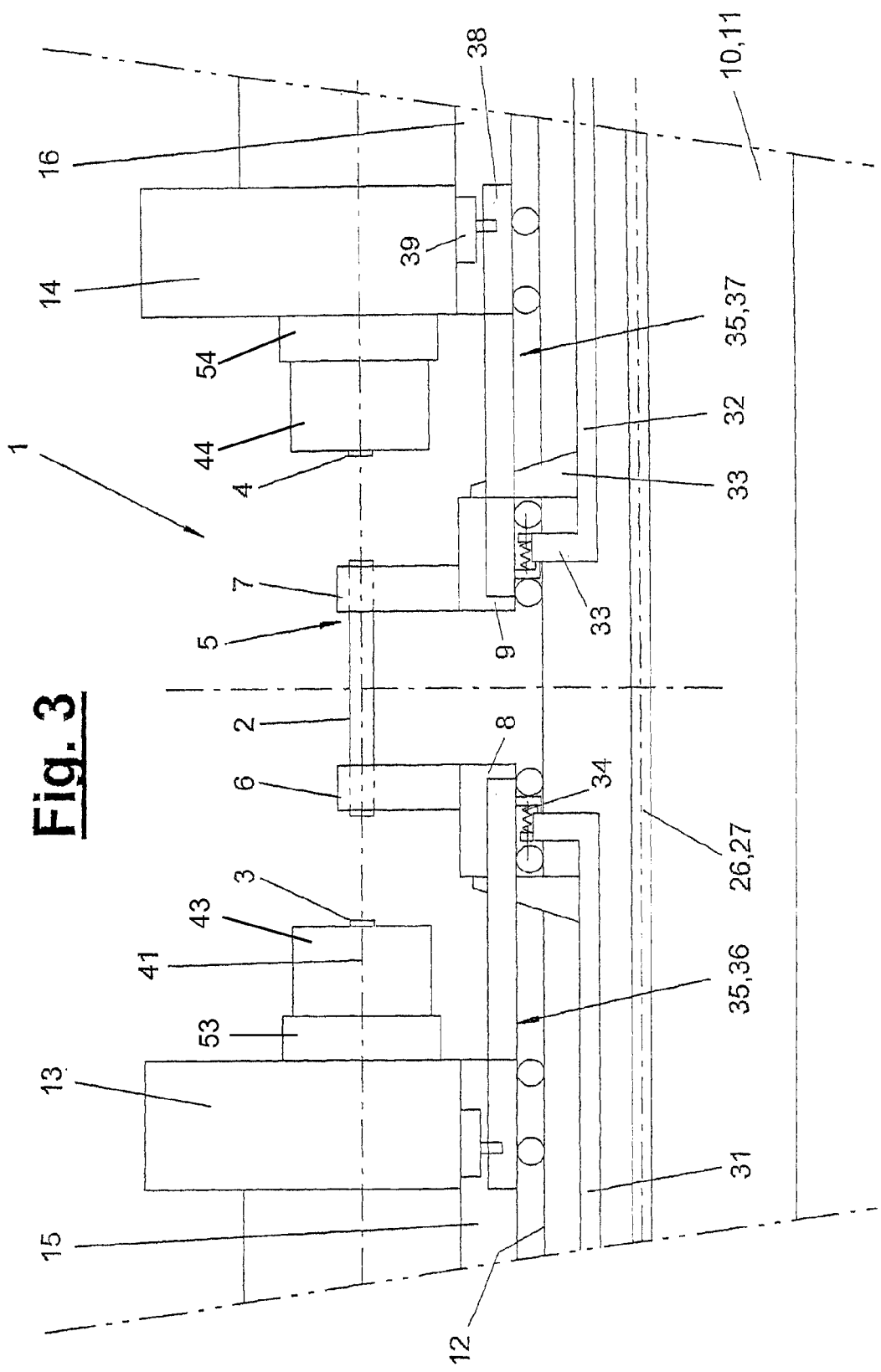
FIG. 3 is an enlarged view of the middle area of the pressure welding machine according to FIG. 1.

Referring to the drawings in particular, FIGS. 1 through 3 show schematic side views and different operating positions of a pressure welding machine (1). The pressure welding machine (1) is used to weld two, three or more workpieces (2, 3, 4), wherein one or more outer workpieces (3, 4) are welded to a central workpiece (2) at both ends. The pressure welding technique may be of any desired type. For example, it may be friction welding with direct motor drive or flywheel drive or welding with an arc moved magnetically or in another way, etc. The workpieces (2, 3, 4) are arranged along a preferably common feed axis or upsetting axis (41) and are moved toward one another and connected to one another at the end of the pressure welding operation by an upsetting stroke.

The pressure welding machine (1) is designed as a so-called double-head machine. It comprises a frame (10) with a central clamping device (5) for the central workpiece (2), two mobile welding heads (13, 14) adjoining same on both sides and two adjusting units (17, 18) that in turn adjoin the latter on both sides with feed drives (23) for the welding heads (13, 14). The pressure welding machine (1) has, furthermore, a computerized, programmable machine and process control (not shown). The central clamping device (5), the welding heads (13, 14) and the adjusting units (17, 18) are all mounted at the frame (10) movably along the preferably common feed axis or upsetting axis (41) by means of travel carriages (8, 9, 15, 16, 19, 20) and are mounted and guided axially movably at a preferably likewise common carriage guide (12). The mounting and guiding may be brought about, e.g., by means of nontilting roller bearings or the like. The two outer adjusting units (17, 18) are connected to one another and supported by means of a common adjusting element (26) with an adjusting drive (25).

The adjusting element (26) is preferably designed as a continuous spindle (27) with two threads (28, 29), which are arranged at least at the end and are directed in opposite directions. These threads (28, 29) are designed each as motion threads, especially as left-handed and right-handed screw threads. They may be, e.g., trapezoid threads. The threads (28, 29) mesh with nuts (21, 22), which are connected to the adjusting units (17, 18) via extension arms. The spindle (27) is arranged under the welding heads (13, 14) and the adjusting units (17, 18) and is mounted rotatably in a machine bed (11). The spindle is located between the laterally spaced rails of the carriage guide (12) and may be arranged at the same level as these rails or just below them. The threads (28, 29) and/or the spindle (27) may be fixed in any desired and suitable manner in the inoperative position when needed, e.g., by means of brakes, a thread self-locking mechanism or the like.

The upsetting forces that occur during pressure welding and are exerted by the feed drives (23) are transmitted by the nuts (21, 22) to the adjusting element (26) and to the spindle (27) and supported. As a result, a closed frictional connection is obtained, which relieves the load on the frame (10). Only overturning moments that may develop need to be absorbed via the carriage guide (12). The travel carriages (19, 20) of the adjusting units (17, 18) can, moreover, be additionally fixed in the operating positions at the carriage guide (12) and at the frame (10) by clamping means or the like.

As an alternative, the adjusting element (26) may have another suitable design. This also applies to the adjusting drive (25) of the adjusting element. It is designed as a spindle drive in the exemplary embodiment being shown and comprises a motor (30), which can be accurately controlled for precise positioning, preferably an electric motor. A reducing gear may be inserted between the motor (30) and the spindle (27).

The central clamping device (5) comprises two workpiece holders (6, 7), which are arranged at axially spaced locations from one another and hold and clamp the central workpiece (2) in the vicinity of the front ends with suitable clamping means. The workpiece holders (6, 7) are equipped with a travel carriage or holder carriage (8, 9) each and can move independently from one another along the carriage guide (12) and the upsetting axis (41). The workpiece holders (6, 7) or their holder carriages (8, 9) are connected to the respective associated adjusting unit (17, 18) via a rod-shaped carriage adjuster (31, 32) in a positive-locking manner. The carriage adjuster (31, 32) is fixed rigidly, e.g., to the travel carriage (19, 20) of the adjusting unit (17, 18) and is moved along during the travel motions of the adjusting unit (17, 18). The carriage adjusters (31, 32) engage associated workpiece holders (6, 7) or holder carriages (8, 9) at the other end via one or more carriers (33) in a positive-locking manner. Carrying takes now place during the forward and backward travel.

A spring (34) is inserted in the direction of the machine center between the carrier (33) and the workpiece holder (6, 7) and the holder carriages (8, 9). It brings about the absorption of the evading motions of the workpiece holders (6, 7) during upsetting. The central workpiece (2) undergoes deformation under pressure at the very strong upsetting forces occurring, which may reach up to 20 tons or more, and the workpiece holders (6, 7) move against the restoring force of the spring (34) and migrate to the axial center of the machine. After the upsetting pressure or the upsetting force is relieved, reverse motion into the starting position takes place while the spring (34) is released.

The welding heads (13, 14) are designed corresponding to the selected welding technique and are equipped with travel carriages (15, 16). The welding heads (13, 14) have chucks (43, 44) to receive and clamp the left and right workpieces (3, 4). For friction welding, the welding heads (13, 14) may each have a rotary drive (53, 54) for the chuck, as a result of which the corresponding workpiece (3, 4) is rotated in relation to the preferably stationary central workpiece (2) for friction. For welding with a magnetically moved arc, the arc unit needed for this is arranged at the welding heads (13, 14) and/or at the central clamping device (5) with a coil for deflecting the arc, etc. If other pressure welding techniques are used, which bring about heating of the boundary surfaces of the workpieces (2, 3, 4) to be welded together in another manner, the welding heads (13, 14) have a correspondingly different design.

The feed drive (23) of the corresponding adjusting unit (17, 18) acts on the welding heads (13, 14) on the rear side. The feed drive (23) is preferably aligned with the workpieces (2, 3, 4) in the common feed axis (41) or is possibly arranged in parallel thereto at a closely spaced location. The feed drive (23) brings about the feeding of the corresponding welding head (13, 14) from the withdrawn inoperative position shown in FIG. 1 into the working position shown in FIG. 2. The boundary surfaces of the adjacent workpieces (2, 3, 4) come into contact depending on the welding process in the working position or are positioned at a certain distance from one another. Depending on the welding process, they are held in this position for some time or are moved on.

Friction feed directed toward the machine center takes place during friction welding. During welding with arc moved magnetically or according to another method, the welding heads (13, 14) at first remain stationary in the feed position. In addition, the necessary upsetting stroke directed against each other is applied with the needed upsetting forces or upsetting pressures at the end of the pressure welding process by means of the feed drives (23), which are preferably aligned axially. After the end of the pressure welding process, the feed drives (23) will again return the welding heads (13, 14) into the starting position according to FIG. 1. Unloading and loading of the pressure welding machine 1 with the workpieces (2, 3, 4) is possible in this starting position.

The feed drives (23) are preferably of the same design. They may have any desired embodiment. In the exemplary embodiment being shown, they are hydraulic cylinders (24), which are arranged and supported in the structures of the adjusting units (17, 18). The piston rods of these cylinders are connected to the corresponding welding head (13, 14). As an alternative, they may be electric motor drives with extensible spindles or the like. Besides, any other desired types of drive technique are possible.

The pressure welding machine (1) has a measuring means (35) for measuring the true feeds during the welding process and the pure workpiece shortenings occurring in the process without being affected by the above-mentioned elastic upsetting deformation of the central workpiece (2). The measuring means (35) is of independent significance and can also be used successfully in other types of pressure welding machines, especially those according to the state of the art. This applies, e.g., to pressure welding machines (1) with stationary adjusting units (17, 18) or stationarily arranged feed drives (23).

The measuring means (35) has at least one measuring unit (36, 37) arranged between a workpiece holder (6, 7) and the associated welding head (13, 14). In the exemplary embodiment being shown with two displaceable welding heads (13, 14), two such measuring units (36, 37) are present. The measuring units (36, 37) comprise each a rod- or bar-shaped scale (38) and a measuring head (39), which are arranged movably in relation to one another at the workpiece holder (6, 7) and at the respective associated welding head (13, 14). In the exemplary embodiment being shown, the scale (38) is arranged at the workpiece holder (6, 7) and is directed along the feed axis (41). It extends from the workpiece holder (6, 7) rearwardly to the associated welding head (13, 14). The scale (38) is designed, e.g., as a glass rod and carries a scale of path markings. The reading head (39) is arranged at the welding head (13, 14) in this embodiment and is directed toward the associated scale (38). The measuring head (39) may be, e.g., an optical path measuring unit, which reads the markings on the scale (38). As an alternative, any other suitable path-measuring technique may be used, the scale (38) and the measuring head (39) being of a corresponding design. The kinematic association shown in the drawings may also be reversed, in which case the measuring head (39) is located at the workpiece holder (6, 7) and the scale (38) at the welding head (13, 14).

The relative axial motion between the workpiece holder (6, 7) and the welding head (13, 14) can be measured with high accuracy by means of the measuring units (36, 37). This relative motion indicates the exact friction and upsetting path during friction welding. As a result, the component shortening of the entire welded part, brought about by the friction welding, is obtained from the sum of the left and right paths. During welding with magnetically moved arc, the workpieces are subsequently brought into spaced locations to ignite the arc after an initial contact, and the positioning necessary for the process and the distance of the workpieces (2, 3, 4) to be welded together are set by means of the measuring units (36, 37) and the motion is carried out to reach the given position. The resulting shortening of the workpiece can be determined after the subsequent upsetting stroke.

Furthermore, the measuring means (35) may have a central measuring unit (40), which is arranged, e.g., between the workpiece holders and/or optionally also between the welding heads (13, 14). The overall length of the workpieces (2, 3, 4) before the welding and also after the welding can thus be determined. The central measuring unit (40) is schematically indicated in FIG. 1. It may have any desired and suitable design and likewise have one or more rod-shaped scales (38) and measuring heads (39).

The welding heads (13, 14), the adjusting drive (25), the adjusting units (17, 18) with the feed drives (23) and the measuring means (35) are connected to the machine and process control and are controlled and regulated by this with suitable programs.

Various modifications of the embodiment being shown are possible. This applies to the embodiment of the central clamping device (5), the welding heads (13, 14), the adjusting units (17, 18) and the adjusting element (26) along with the adjusting drive (25). The frame (11) may also have a different design. The type and the arrangement of the travel carriages (8, 9, 15, 16, 19, 20) are selectable as desired. This also applies to the type and the arrangement of the carriage guide (12). While specific embodiments of the invention have been shown and described in detail to illustrate the application of the principles of the invention, it will be understood that the invention may be embodied otherwise without departing from such principles.

What is claimed is:

1. A pressure welding machine comprising:
    a common frame;
    two mobile welding heads, which are movable on said frame along a feed axis, each of said welding heads having a workpiece holder;
    two adjusting units with feed drives acting on a respective one of said welding heads, said two adjusting units being mounted on bearings and being axially movably at said frame, each of said feed drives pushing the respective ones of said welding heads in the axial direction towards the other of said welding heads;
    a common adjusting element, said two adjusting units being connected to one another by said common adjusting element and each of said two adjusting units being connected to said common adjusting element by a common adjusting element connection; and
    an adjusting drive driving said common adjusting element and axially moving and positioning each of said two adjusting units along said common frame, said two adjusting units being connected to said adjusting drive via said common adjusting element, wherein forces exerted by each of said two adjusting units generate reaction forces during friction welding, said reaction forces being transmitted directly to said common adjusting element via said common adjusting element connection to relieve load on said frame.

2. The pressure welding machine in accordance with claim 1, wherein said common adjusting element is designed as a continuous spindle with two threads, which are directed in opposite directions and are connected to nuts at said adjusting units, wherein movement of said common adjusting element via said adjusting drive corresponds to movement of at least said two adjusting units in the axial direction.

3. The pressure welding machine in accordance with claim 2, wherein said threads are designed as motion threads, comprising ball or trapezoid threads.

4. The pressure welding machine in accordance with claim 2, wherein said spindle is arranged under said welding heads and said adjusting units in machine bed of said frame.

5. The pressure welding machine in accordance with claim 2, wherein said adjusting drive has a controllable motor comprising an electric motor, for driving said spindle.

6. The pressure welding machine in accordance with claim 1, wherein said frame has a carriage guide for the positive-locking mounting and guiding of travel carriages of the welding heads and said adjusting units.

7. The pressure welding machine in accordance with claim 6, further comprising a mobile central clamping device for a central workpiece, which is mounted movably at said carriage guide and guided between said welding heads.

8. The pressure welding machine in accordance with claim 7, wherein said central clamping device has two spaced clamping device workpiece holders, which have holder carriages mounted movably at said carriage guide, one of said two spaced clamping device workpiece holders being connected to one of said adjusting units, another one of said two spaced clamping device workpiece holders being connected to another one of said adjusting units, wherein movement of said common adjusting element via said adjusting drive corresponds to movement of at least said two adjusting units and said two spaced clamping device workpiece holders in the axial direction.

9. The pressure welding machine in accordance with claim 7, wherein said pressure welding machine comprises a friction welding machine with each of said welding heads having a rotary drive for rotating a corresponding workpiece in relation to said central workpiece for friction welding.

10. The pressure welding machine in accordance with claim 1, wherein each said workpiece holder is connected to respective associated adjusting unit by a carriage adjuster.

11. The pressure welding machine in accordance with claim 10, wherein said carriage adjusters have a carrier and a spring for relative evading motions at the connection point with said workpiece holder.

12. The pressure welding machine in accordance with claim 1, further comprising a measuring means for measuring the true feeds and the pure workpiece shortening without elastic deformation.

13. The pressure welding machine in accordance with claim 12, wherein said measuring means has at least one measuring unit arranged between said workpiece holder and said associated welding head.

14. The pressure welding machine in accordance with claim 13, wherein said measuring unit has a scale and a measuring head, which are arranged movably in relation to one another at said workpiece holder and at said associated welding head.

15. The pressure welding machine in accordance with claim 12, wherein said measuring means has a central measuring unit between each said workpiece holder and said welding heads.

16. The pressure welding machine in accordance with claim 1, wherein said pressure welding machine comprises a machine for welding with moving arc with an arc unit arranged at at least one of the welding heads and at the central clamping device and with a coil for deflecting the arc.

17. A method for pressure welding a plurality of workpieces along a common feed axis, the method comprising:
providing a pressure welding machine with a common frame;
providing two welding heads movable on said frame along a feed axis, each of said welding heads having a workpiece holder;
providing two adjusting units with bearings for axial movement of the adjusting units at the common frame and with feed drives for driving said welding heads;
moving said workpieces relative to one another by the feed drives of the two adjusting units mounted axially movably at the common frame and applying pressure welding forces from said adjusting units to respective said welding heads;
connecting said two adjusting units to one another by a common adjusting element with an adjusting drive driving said common adjusting element and positioning each of said two adjusting units along said common frame; and
mutually supporting said adjusting units in an adjustable manner with the common adjusting element while absorbing the pressure welding forces at the common adjusting element with the common adjusting element and supported adjusting units forming a closed system of forces.

18. The method in accordance with claim 17, wherein said adjusting units and a central clamping device are positioned simultaneously and synchronously for a central workpiece, wherein rotation of said common adjusting element via said adjusting drive corresponds to movement of at least said two adjusting units in an axial direction of said frame.

19. The method in accordance with claim 18, wherein true feeds and workpiece shortenings are measured during pressure welding without the elastic deformations of said central workpiece that occur during upsetting, said central clamping device comprising a first clamping device workpiece holder and a second clamping device workpiece holder, said first clamping device workpiece holder being connected to one of said two adjusting units, said second clamping device workpiece holder being connected to another one of said two adjusting units, wherein rotation of said common adjusting element via said adjusting drive corresponds to movement of at least said first clamping device workpiece holder and said second clamping device workpiece holder in said axial direction of said frame.

20. The method in accordance with claim 17, wherein said pressure welding machine comprises a friction welding machine with each of said welding heads having a rotary drive for rotating a corresponding workpiece in relation to said central workpiece for friction welding.

21. The method in accordance with claim 17, wherein said pressure welding machine comprises a machine for welding with moving arc with an arc unit arranged at at least one of the welding heads and at the central clamping device and with a coil for deflecting the arc.

22. A pressure welding machine comprising:
a common frame;
a first mobile welding head movably mounted on said common frame for movement along a feed axis, said first mobile welding head having a first workpiece holder;

a second mobile welding head movably mounted on said common frame for movement along said feed axis, said second mobile welding head having a second workpiece holder;

a first side adjusting unit mounted on bearings and axially movable at said common frame and with a first side feed drive acting on said first mobile welding head with resulting upsetting forces at said first side adjusting unit;

a second side adjusting unit on bearings and axially movable at said common frame and with a second side feed drive acting on said second mobile welding head with resulting upsetting forces at said second side adjusting unit;

a common adjusting element, said two adjusting units being connected to one another by said common adjusting element and each being supported by said common adjusting element with resulting upsetting forces at said first side adjusting unit transmitted from said first side adjusting unit to said common adjusting element and with resulting upsetting forces at said second side adjusting unit transmitted from said second side adjusting unit to said common adjusting element to provide a closed frictional connection between said first side adjusting unit and said second side adjusting unit to relieve load applied by said first side adjusting unit and said second side adjusting unit on said frame; and an adjusting drive for driving said common adjusting element for positioning each of said first side adjusting unit and said second side adjusting unit along said common frame, said first side adjusting unit being only driven via said common adjusting element with said common adjusting element being connected to said adjusting drive as a drive connection, said second side adjusting unit being only driven via said common adjusting element, whereby all load of applied axial force to form a friction weld is transmitted to said common adjusting element.

23. The pressure welding machine in accordance with claim 22, further comprising:

a travel carriage associated with each of said first mobile welding head, said second mobile welding head, said first side adjusting unit and said second side adjusting unit; and a carriage guide for the positive-locking mounting and guiding of said travel carriage of the first mobile welding head, said second mobile welding head, said first side adjusting unit and said second side adjusting unit, wherein said common adjusting element comprises a continuous single part spindle with two threads, said two threads being directed in opposite directions and with nuts engaging said threads, each of said nuts being connected to a respective one of said first adjusting unit and said second adjusting unit, wherein said threads are motion threads comprising ball or trapezoid threads for moving each nut along said spindle upon said adjusting drive driving said spindle in rotation with rotation of said spindle moving said first adjusting unit and said second adjusting unit along said frame wherein axial movement of said first side adjusting unit and said second side adjusting unit is based on rotation of said common adjusting element via said adjusting drive.

* * * * *